United States Patent Office

3,303,181
Patented Feb. 7, 1967

3,303,181
POLYMERIZATION OF OLEFINS IN THE PRESENCE OF A CATALYST MODIFIED WITH AN ORGANIC ANHYDRIDE
Felix Bloyaert and Henri Toussaint, Brussels, Belgium, assignors to Solvay & Cie., Société en commandite, a simple of the Kingdom of Belgium
No Drawing. Filed July 1, 1963, Ser. No. 292,129
Claims priority, application Belgium, July 11, 1962, 620,081
12 Claims. (Cl. 260—94.9)

The present invention concerns a process for the polymerization and copolymerization of olefins in the presence of improved catalysts. In one aspect, it relates to the catalysts and the preparation thereof.

The invention can be applied generally to all the low-pressure processes for the polymerization of olefins and is particularly appropriate for the polymerization of lower olefins, containing 2 to 4 carbon atoms, under pressures lower than 200 atmospheres.

As catalysts suitable for the polymerization of olefins under low pressure, catalysts comprising an oxygenated compound of chromium at least partially in the hexavalent state, deposited on a silica-alumina support, catalysts comprising a reduced oxide of Groups V and VI of the Periodic Table of Elements [1], deposited on alumina, catalysts obtained by mixing titanium tetrachloride, aluminum chloride and powdered aluminum, and catalysts resulting from mixing a compound of a metal of Groups IV–A, V–A and VI–A of the Periodic Table of Elements with an organoaluminum compound are known.

However, the invention applies more particularly to the polymerization and copolymerization of olefins in the presence of a ternary catalyst which forms on commingling:

(a) A metal, a hydride or an organometallic compound of a metal of Groups IV, V and VI of the Periodic Table of Elements;

(b) An inorganic compound of a polyvalent metal having at least three valencies;

(c) A halide of an element of Group III or V (Belgian Patent 547,618).

Ingredients (a) include the tetraalkyls and tetraaryls of tin and of lead, especially those containing up to 40 carbon atoms per molecule, e.g., tetraethyl lead, tetrapropyl lead, tetrabutyl lead, tetraphenyl lead, tetranaphthyl lead, and the corresponding compounds of tin. The tin tetraalkyls produce especially active catalysts.

Ingredients (b) include the mineral acid salts of titanium, vanadium, chromium, molybdenum, and tungsten, the halides of titanium being frequently used.

Ingredients (c) include the halides of aluminum, of antimony, and of boron. Especially suitable are aluminum trichloride, antimony pentachloride, and boron trifluoride. This ternary catalyst allows olefin polymers of high molecular weight to be obtained under favorable conditions and with very good productivity.

The present invention furnishes, and includes among its objects and advantages, an improved process for the polymerization of olefins under low pressure, increasing the activity of the catalyst, lowering the molecular weight of the polymers, narrowing the distribution of the molecular weights, decreasing the proportion of low molecular weight polymers and suppressing the formation of deposits in the polymerization reactors. Other objects and advantages will be apparent to those skilled in the art on reading this disclosure.

According to this invention, the polymerization of olefins by the methods defined hereinbefore and referred to as "low pressure process," is carried out in the presence of a small amount of an anhydride of a carboxylic acid.

All the carboxylic acid anhydrides have given positive results, especially the anhydrides of monocarboxylic aliphatic acids, for example acetic anhydride. Those containing up to 20 carbon atoms per molecule are the most frequently used. The aromatic acid anhydrides and particularly benzoic anhydride have shown properties superior to those of the aliphatic anhydrides for the realization of the objects of the invention.

The cyclic anhydrides of carboxylic diacids have been shown to be very effective, and, among these compounds, phthalic anhydride and its substitution derivatives have shown exceptional properties.

Small amounts of anhydride present in the polymerization medium are enough to obtain the desired effects. In practice, the polymerization is carried out in the presence of 0.01 to 1 gram mole of anhydride per gram atom of transition metal used in the catalytic system.

The anhydride necessary to improve the polymerization conditions can be added either to the catalyst before its introduction into the polymerization reactor, and even during its preparation, or to the polymerization diluent, or even by any other means which assures its presence in the polymerization medium.

The favorable effects of the addition of anhydride are multiple. In particular, an increase in the activity of the catalyst, which activity passes through a maximum, corresponding to an activity at least 2.5 times greater than that of the untreated catalyst, for an addition of anhydride of the order of 0.5 gram mole of anhydride per gram atom of transition metal, is observed. The activity of the catalyst then decreases rapidly when more anhydride is added. Generally a molecular ratio of anhydride/transition metal is used which does not exceed 1.

The molecular weight of the polymer obtained is gradually lowered by the addition of increasing amounts of anhydride and can thus be brought at least down to ⅔ of the molecular weight of the products obtained in the absence of this additive. The content of low molecular weight polymers, particularly of polymers soluble in the polymerization diluent, can be brought down to about 10% of the usual value.

The favorable effects of the addition of anhydride are also evidenced by the narrowing of the distribution of the molecular weights of the polymers obtained.

Finally, in accordance with the process of this invention, the encrustation of the walls of the polymerization reactors by polymer film is substantially eliminated, thus insuring in these reactors the maintenance of a high coefficient of heat transfer. Hence, ordinary steel or stainless steel reactors can be used instead of enameled reactors, which are very much more cumbersome, and the polymerization can be carried out continuously without the necessity of frequent stoppages of the installations for cleaning of the reactors, thus entailing a real decrease in maintenance expense.

The following examples, without being unduly limiting, further illustrate the invention.

*Examples 1–6*

As a control run, the polymerization of ethylene is carried out in the presence of a ternary catalyst of the composition $TiCl_4$-$Sn(n\text{-}C_4H_9)_4$-$AlCl_3$.

In an autoclave, a suspension of catalyst prepared by heating at 25° C. for 52 minutes 150 mg. of $TiCl_4$, 555 mg. of $Sn(n\text{-}C_4H_9)_4$ and 200 mg. of $AlCl_3$ is diluted to 1 liter by dry hexane. The autoclave is heated at 80° C. and ethylene is introduced under pressure of 10 atmospheres ---
[1] Lange, N. A.: "Handbook of Chemistry," 4th ed., 1941, Sandusky, Ohio, Handbook Publishers, Inc., pages 18 and 19.

at a rate of about 120 gm./hour. After two hours of polymerization, the reaction is stopped.

The polyethylene obtained is washed, dried and examined. Its average viscosimetric molecular weight is 51,000 and its melt viscosity at 250° C. is 5400 poises. The polymer fraction soluble in hexane reaches 5.1 gm./kg. of hexane, or 23 gm./kg. of polyethylene precipitated.

During the polymerization period, the average activity of the catalyst was 0.502 gm. of polyethylene per hour and per mg. of activated titanium and per atom of ethylene. The relative activity of the catalyst was arbitrarily fixed at 100.

The difference in temperature between the reaction medium and the cooling water ($\Delta t$) is 5° C. during this operation.

The polymerization run is reproduced under identical conditions, except for adding variable amounts of phthalic anhydride and other anhydrides to the polymerization medium. The results appear in the table hereinafter:

TABLE

| Example | Control | 1 | 2 | 3 | 4 | 5 | 6 |
|---|---|---|---|---|---|---|---|
| Additive | None | (1) | (1) | (1) | (2) | (3) | (4) |
| Amount added, anhydride, mg./l. hexane | | 26.2 | 57.5 | 144 | 20 | 20 | 40 |
| Molar ratio anhydride/total Ti | | 0.175 | 0.380 | 0.955 | 0.203 | 0.210 | 0.183 |
| Specific Activity, gm. polyethylene/hr. atm. mgm. activated Ti | 0.502 | 0.651 | 1.025 | 0.122 | 0.638 | 0.768 | 0.863 |
| Relative Activity, percent | 100 (control) | 130 | 204 | 24.3 | 127 | 153 | 172 |
| $\Delta t$, max., ° C | About 5 | 3.2 | 2.5 | 0.8 | 2.0 | 2.2 | 1.9 |
| Viscosimetric molecular weight | 51,000 | 41,000 | 37,000 | 37,000 | 39,000 | 42,000 | 38,000 |
| Melt viscosity at 250° C., poises | 5,400 | 5,100 | 5,200 | 3,700 | 4,100 | 4,200 | 4,000 |
| Dry residues of Hexane, gm./kg.: | | | | | | | |
| Hexane | 5.1 | 3.2 | 1.45 | 2.29 | 4.42 | 3.5 | 2.1 |
| Precipitated polyethylene | 23 | 12 | 4.6 | 20.8 | 18 | 13.1 | 7.9 |
| Encrustations on the walls, gm. polyethylene/kg. total polyethylene | 25 | None | None | None | None | None | None |

1 Phthalic anhydride.    2 Acetic anhydride.    3 Maleic anhydride.    4 Benzoic anhydride.

Remark: The relative decrease of melt viscosity is generally less marked than the decrease of molecular weight, indicating a narrowing of the distribution of molecular weight.

It can be concluded from experimental data that, if the addition of 0.02 gram mole of anhydride per gram atom of titanium produces an appreciable effect, larger amounts, of the order of 0.1 to 0.5 gram mole, are necessary to reach maximum activity of the catalytic system. For such additions of anhydride, a substantial lowering of the molecular weight of the polyethylene from 50,000 to 40,000 in the particular cases studied, a very large decrease of the fraction of low polymers soluble in hexane, an improvement of the heat exchange between the reactor and the coolant are noted also, being evidenced by a drop in the temperature differential ($\Delta t$) between these two media, and the total elimination of deposits in the reactor. These last-mentioned favorable effects are also evident when larger amounts of anhydride are added. In practice, however, a value of the mol ratio anhydride/ transition metal, equal to one, is not ordinarily exceeded, because, as soon as this ratio reaches 0.5, a lowering of the catalyst activity is observed. Again, it is observed that although all the anhydrides exert a favorable effect, the aromatic anhydrides are shown to be particularly effective.

We claim:

1. In a process for polymerizing at least one 1-olefin to solid polymer in the presence of a catalyst which forms on mixing
    (a) a material selected from the group consisting of the metals, the hydrides, and the tetraalkyl and tetraaryl compounds having up to 40 carbon atoms per molecule of Ge, Sn, Pb,
    (b) a halide of a metal selected from the group consisting of IV–B, V–B, and VI–B metals wherein all valences of the metal are satisfied by halide, and
    (c) a halide of a metal selected from the group consisting of B, Al, Ga, In, Tl, Sb, and Bi wherein all the valences of the metal are satisfied by halide;

the improvement which comprises supplying to the polymerization mixture a minor amount of a carboxylic acid anhydride having up to 20 carbon atoms per molecule selected from the group carboxylic aliphatic acid anhydrides, aromatic acid anhydrides, and cyclic anhydrides of dicarboxylic acids and thus modifying the molecular weight of the resulting polymer.

2. In a process in which a 1-olefin is polymerized in the presence of a ternary catalyst which forms on mixing
    (a) a material selected from the group consisting of the tetraalkyl and tetraaryl compounds having up to 40 carbon atoms per molecule of Ge, Sn, Pb,
    (b) a halide of a metal selected from the group consisting of IV–B, V–B, and VI–B metals wherein the valences of the metal are satisfied by halides, and
    (c) a halide of a metal selected from the group consisting of B, Al, Ga, In, Tl, Sb, and Bi wherein all the valences of the metal are satisfied by halides;

the improvement which comprises supplying to the polymerization mixture a carboxylic acid anhydride having up to 20 carbon atoms per molecule and selected from the group consisting of monocarboxylic aliphatic acid anhydrides, cyclic anhydrides of dicarboxylic acids, and aromatic acid anhydrides, the amount of anhydride added being in the range 0.01 to 1 mole per gram atom of said transition metal.

3. A process which comprises polymerizing ethylene to solid polymer in the presence of phthalic anhydride and a catalyst which forms on mixing titanium tetrachloride, tetra-(n-butyl)-tin and aluminum trichloride, the anhydride being added in an amount in the range 0.1 to 0.5 mole per gram atom of titanium.

4. A process which comprises polymerizing ethylene to solid polymer in the presence of acetic anhydride and a catalyst which forms on mixing titanium tetrachloride, tetra-(n-butyl)-tin and aluminum trichloride, the anhydride being added in an amount in the range 0.1 to 0.5 mole per gram atom of titanium.

5. A process which comprises polymerizing ethylene to solid polymer in the presence of maleic anhydride and a catalyst which forms on mixing titanium tetrachloride, tetra-(n-butyl)-tin and aluminum trichloride, the anhydride being added in an amount in the range 0.1 to 0.5 mole per gram atom of titanium.

6. A process which comprises polymerizing ethylene to solid polymer in the presence of benzoic anhydride and a catalyst which forms on mixing titanium tetrachloride, tetra-(n-butyl)-tin and aluminum trichloride, the anhydride being added in an amount in the range 0.1 to 0.5 mole per gram atom of titanium.

7. An improved catalyst which forms on adding a carboxylic acid anhydride to a ternary catalyst which forms on commingling
    (a) a material selected from the group consisting of the metals, the hydrides, and the tetraalkyl and tetraaryl compounds having up to 40 carbon atoms per molecule of Ge, Sn, Pb,
(b) a halide of a metal selected from the group consisting of IV–B, V–B, and VI–B metals wherein all the valences of the metal are satisfied by halide, and
(c) a halide of a metal selected from the group consisting of B, Al, Ga, In, Tl, Sb, and Bi wherein all the valences of the metal are satisfied by halide; said anhydride having up to 20 carbon atoms per molecule and being selected from the group carboxylic aliphatic acid anhydrides, aromatic acid anhydrides, and cyclic anhydrides of dicarboxylic acids, the amount of said anhydride being a promoting amount.

8. An improved polymerization catalyst which forms on adding phthalic anhydride to a catalyst which is active for the polymerization of ethylene to normally solid polymer and which forms on mixing titanium tetrachloride, tetra-normal-butyl tin, and aluminum trichloride, said anhydride being added in an amount in the range 0.1 to 0.5 mol per gram atom of titanium.

9. An improved polymerization catalyst which forms on adding acetic anhydride to a catalyst which is active for the polymerization of ethylene to normally solid polymer and which forms on mixing titanium tetrachloride, tetra-normal-butyl tin, and aluminum trichloride, said anhydride being added in an amount in the range 0.1 to 0.5 mol per gram atom of titanium.

10. An improved polymerization catalyst which forms on adding maleic anhydride to a catalyst which is active for the polymerization of ethylene to normally solid polymer and which forms on mixing titanium tetrachloride, tetra-normal-butyl tin, and aluminum trichloride, said anhydride being added in an amount in the range 0.1 to 0.5 mol per gram atom of titanium.

11. An improved polymerization catalyst which forms on adding benzoic anhydride to a catalyst which is active for the polymerization of ethylene to normally solid polymer and which forms on mixing titanium tetrachloride, tetra-normal-butyl tin, and aluminum trichloride, said anhydride being added in an amount in the range 0.1 to 0.5 mol per gram atom of titanium.

12. The improved catalyst according to claim 7 wherein the amount of said anhydride is in the range of 0.01 to 1 mole per gram atom of the metal of (b).

No references cited.

JOSEPH L. SCHOFER, *Primary Examiner.*

M. B. KURTZMAN, *Assistant Examiner.*